(12) United States Patent
Anderson et al.

(10) Patent No.: US 6,318,395 B1
(45) Date of Patent: Nov. 20, 2001

(54) METHOD AND APPARATUS FOR SEWER SYSTEM FLOW CONTROL TO REDUCE WASTEWATER TREATMENT ELECTRICAL COSTS

(75) Inventors: Claude T. Anderson, Forest Lake; Ronald L. Jacobson, Rosemount; Michael G. Rieth, Woodbury, all of MN (US)

(73) Assignee: Aquaflow Technologies, LLC, Forest Lake, MN (US)

( * ) Notice: Subject to any disclaimer, the term of this patent is extended or adjusted under 35 U.S.C. 154(b) by 0 days.

(21) Appl. No.: 09/437,363

(22) Filed: Nov. 10, 1999

(51) Int. Cl.[7] .................................................. E03F 1/00

(52) U.S. Cl. ........................ 137/1; 137/236.1; 210/170; 138/45

(58) Field of Search ..................... 137/236.1; 210/170; 138/44, 45, 46

(56) References Cited

U.S. PATENT DOCUMENTS

| | | |
|---|---|---|
| 3,974,655 | 8/1976 | Halpern . |
| 4,167,358 | 9/1979 | Besha . |
| 4,494,345 | 1/1985 | Peterson . |
| 4,503,881 | 3/1985 | Vecchio . |
| 4,578,188 * | 3/1986 | Cousino ............................... 210/170 |
| 5,321,601 | 6/1994 | Riedel . |
| 5,406,972 | 4/1995 | Coscarrella . |
| 5,575,304 * | 11/1996 | Hassett .......................... 137/236.1 X |
| 5,673,723 * | 10/1997 | Roediger ....................... 137/236.1 X |
| 5,853,589 | 12/1998 | Desjardins . |

OTHER PUBLICATIONS

U.S. Environmental Protection Agency, Manual: Combined Sewer Overflow Control, EPA/625/R–93/007, pp. 30–41, USA, Sep. 1997.

Water Environment Federation and American Society of Civil Engineers, ASCE, Design of Municipal Wastewater Treatment Plants, WEF MOP No. 8, vol. 1: Chp 1–12, pp. 439–445, Alexandria, VA, USA, 1992.

Northern States Power Company, NSP Minnesota Load Management Prices, Minneapolis, MN, USA, May 1995.

Water Environment Federation, Energy Conservation in Wastewater Treatment Facilities, WEF MOP No. FD–2, pp. 25, 31–33, 149–163, Alexandria, VA, USA, 1997.

American Society of Civil Engineers and Water Environment Federation, Design and Construction of Sanitary and Storm Sewers, pp. 128–130, USA, 1969.

Metcalf & Eddy, Inc., Wastewater Engineering: Treatment, Disposal and Reuse, McGraw–Hill Publishing Company, p. 1104, New York, NY, USA, 1991.

* cited by examiner

*Primary Examiner*—Kevin Lee

(57) ABSTRACT

A method and apparatus for diurnally storing and releasing municipal sewage in its conveyance network of sewers and interceptor piping to affect a reduction in peak energy demand and on-peak energy usage at the wastewater treatment plant, and, to reduce peak loadings to wastewater treatment plant clarifiers, aeration basins, channels and pumps, thereby improving plant performance and extending the wastewater treatment plant capacity. Utilization of the existing sewer system provides a way to obtain cost effective electrical cost reductions, flow equalization capacity, or an optimized combination thereof. With the disclosed invention it is possible to equalize wastewater flows, or alternatively to shift flow peaks from the on-peak electric rate periods to the off-peak electric rate periods providing less equalization.

18 Claims, 9 Drawing Sheets

METHOD AND APPARATUS FOR SEWER SYSTEM FLOW CONTROL TO REDUCE WASTEWATER TREATMENT ELECTRICAL COSTS

BACKGROUND OF THE INVENTION

This invention relates to a method and an apparatus for the control of wastewater flow to a wastewater treatment plant (WWTP) in order to reduce the cost of electricity during times of high electrical charges. The invention discloses the use of the sewage collection and conveyance networks as temporary storage units in order to either reduce peak flow rates or to shift the time period when the peak flow reaches the WWTP.

Municipal sewage commonly flows thru a network of variable sized sewer and interceptor pipes from residential homes and industries to wastewater treatment facilities. The wastewater treatment process at such facilities is energy intensive, with an approximate annual US electrical bill in the range of $500 million to $1 billion dollars. Because of the natural diurnal variation in wastewater flow, wastewater flow rates at a WWTP tend to increase during the day to coincide with the time period of higher electric rates. However, sewer networks typically have redundant and excess storage capacity to meet infrequent extreme flows. Sewers are generally designed for a 50-yr life and also include excess capacity expected to be required during the design life of a sewer. This excess capacity can be used to store and then deliver sewage flow to the treatment facilities so the wastewater can be treated in order to take advantage of lower electric rates.

Electricity is used by a WWTP for a variety of uses such as compressing air for biological treatment processes, pumping liquids, and process sludge. The electrical usage is related to the flow of sewage into the plant and increases as the flow increases. In general, wastewater flow is high during the day and low at night while the cost of electricity is higher during the day than at night. Thus the cost of electricity varies with the time of day. Another cost factor is the peak demand of electricity (maxmium short-term power drawn during the billing period) by the WWTP.

The prior art describes a number of ways that WWTPs have utilized to lower electrical costs. These methods include, providing on-site electricity generating capcicity, replacing existing electrical motors with higher efficiency motors, shifting electrical use, where possible, to periods of lower demand and replacing existing processes with higher efficiency processes. Also, replacing coarse bubble aeration with fine bubble aeration will usually result in a significant electrical savings as will the implementation of a dissolved oxygen control strategy and instrumentation. None of these methods to lower WWTP electrical costs teach flow shifting within the existing sewer system as a way to reduce electrical costs or to provide flow equalization.

In order to minimize the electricity expense, the sewage flow into the plant needs to be controllable so that high flows occur when electricity rates are low and low flows occur when electricity rates are high, so that the new flow profile favors low peak demands. In general, electric utility rate structures vary among companies and between states and WWTPs and typically are subject to complex rate structures classified under the heading industrial use. Rates are generally affected by supply and demand with incentives to load shift and reduce peak demand during high use (daytime) hours.

Wastewater treatment plants are typically designed and built to treat a fluctuating flow stream, one that varies widely throughout the day and possibly the season in both quantity and strength. These variations in loading require process units and equipment be large enough to meet reasonable daily peak loadings, periodic seasonal peak loadings such as rain events, and the projected demand imposed by future growth. By controlling the flow to the process at a more even rate, loadings are more consistent, and biological and energy demands are more stable. Through the dampening effects of equalization, only the treatment units and equipment needed to meet the equalized loadings are required to operate. One method known to accomplish equalization is the use of equalization basins which have a volume generally less than 35% of the WWTP capacity. They can be located on site or upstream of the WWTP and arranged as separate in-line or off-line tanks. The result is an overall improvement in WWTP efficiencies, more consistent removal rates, reduced electrical peak-demand charges, and possibly decreased power consumption. Additional benefits include the dissipation of shock loads that most WWTPs experience and the extension of the operating capacity within the existing facility because the initial design capacity was oversized to allow for peak demands. The beneficial effects of equation for biological wastewater treatment processes are described in the U.S. Pat. No. 5,853,589 issued to G. Desjardins on Dec. 29, 1998.

It is known from the prior art that sewage overflows from combined sewer interceptors results in continued degradation of receiving water quality. The prior art describes the construction of deep tunnels for the capture and storage of combined sewage and storm water runoff. These tunnels collect storm water and sewage during a storm so that it is not bypassed to the receiving water. Following the storm, the collected storm water and sewage in the tunnels is then pumped to the treatment plant. Off-line basins or tanks are most widely used. In cases where stormwater and wastewater are combined in sewers, flow rates are regulated by system design features so that wastewater treatment plant capacities are not exceeded. Historically, diversion or regulator structures were required to divert flows in excess of the treatment plant capacity to the surface receiving water via the combined sewer overflow outlets. Examples of flow control devices used for diversion of storm flow include U.S. Pat. No. 3,974,655 issued to R. Halpern on Apr. 14, 1975, U.S. Pat. No. 4,167,358 issued to J. Besha on Sep. 11, 1979 and U.S. Pat. No. 5,321,601 issued to D. Riedel on Jun. 14, 1994. Therefore, the use of existing sewer capacity to eliminate or minimize diversions from combined sewers is known. Flow control devices are also available for preventing back-flow in sewer systems. Examples of these include U.S. Pat. No. 5,406,972 issued to G. Coscarella on Apr. 18, 1995, U.S. Pat. No. 4,503,881 issued to F. Vecchio on Mar. 12, 1985 and U.S. Pat. No. 4,494,345 issued to B. Peterson on Jan. 22, 1985. None of these flow control devices are described for use to temporarily reduce diurnal on-peak flow rates to a WWTP on a regular basis for the express purpose of lowering electrical costs.

It is known in the prior art to utilize flow control devices in networked systems to optimize sewer system capacity and thereby reduce the amount of wastewater that is bypassed to surface waters during extreme flow events. None of these networked systems are described as being useful to temporarily reduce diurnal on-peak flow rates to a WWTP on a regular basis to lower electrical costs for the WWTP.

SUMMARY OF THE INVENTION

This invention relates to a method and an apparatus for control of flow of sewage to a wastewater treatment plant (WWTP) for the express purpose of reducing electrical costs. The invention discloses the use of the sewage collection and conveyance networks as temporary storage units in order to reduce or time-shift peak wastewater flows to the WWTP.

Electricity is among the largest expenses in a wastewater treatment plant (WWTP) budget, alongside debt and personnel costs. Therefore, cost control through energy management is generally a high priority for all WWTP managers.

By controlling the flow to the process at a more even rate, loadings are more consistent, and biological and energy demands are more stable. Through the dampening effects of equalization, only the treatment units and equipment needed to meet the average demand are required to operate. The result is an overall improvement in WWTP efficiencies, more consistent removal rates, reduced peak-demand charges, and decreased power consumption.

Utilization of the existing sewer system provides a way to obtain electrical cost reductions, flow equalization capacity, or an optimized combination thereof. However, with the disclosed invention it is possible to equalize wastewater flows, or alternatively to more dramatically shift flow peaks from the on-peak electric rate periods to the off-peak electric rate periods which can be designed to provide less equalization by attenuating and shifting the flow peak. This would require utilizing additional storage volume in the sewer system and the economic benefits of equalization may outweigh the cost savings associated with maximizing the energy bill reductions from time-shifting alone. Additional benefits of flow equalization include the dissipation of shock loads that most WWTPs experience and extension of the operating capacity of the existing facility.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new a method to control on-peak flow rates and thereby reduce the cost of electricity for sewage treatment. This new method and apparatus has many of the advantages mentioned heretofore and several novel features that result in a new method and apparatus which is not anticipated, rendered obvious, suggested, or even implied by any of the prior art methods to reduce the cost of electricity for sewage treatment, either alone or in any combination thereof.

Still yet another object of the present invention is to use the sewage collection and conveyance networks as temporary storage units in order to control flows resulting in reduced on-peak flows and thereby lower the electrical costs for a WWTP.

It is another object of the present invention to provide a new method to reduce on-peak flow rates or provide flow equalization that can be easily networked throughout a sewer system as needed.

It is another object of the present invention to provide a new method to reduce on-peak flow rates or provide flow equalization that can be easily configured to meet the individualized requirements of a particular WWTP.

It is another object of the present invention to provide a new method to reduce on-peak flow rates or provide flow equalization that can be easily automated if needed.

It is another object of the present invention to provide a new method to reduce on-peak flow rates or provide flow equalization that is rugged and reliable.

It is another object of the present invention to provide a new method to reduce on-peak flow rates or provide flow equalization which may be easily and efficiently manufactured and marketed.

It is another object of the present invention to provide a new method to control flow rates to a WWTP in a way that lowers the electrical costs for a WWTP.

An even further object of the present invention is to provide a new method to reduce peak flow rates or provide flow equalization which is susceptible of a low cost of manufacture with regard to both materials and labor.

These together with other objects of the invention, along with the various features of novel which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

The method of this invention uses excess sewer or interceptor capacity on a regular basis to store and then purposefully release partial volumes of the overall sewage flow, to lessen on-peak treatment plant energy consumption. The method includes the analysis of the sewage flows and the sewer and interceptor piping network to determine an advantageous configuration for storing and releasing partial sewage volume.

Usually, there are general similarities among each wastewater treatment plant and its associated interceptor system and the rate structure for the electrical utility it uses to obtain its electricity. However each system is unique with its own specific characteristics. Therefore, it is apparent that this invention will be custom designed to maximize the benefits for any particular installation. Generally however, the method of this invention allows sewage in any gravity flow sewer or interceptor segment to purposefully be stored up to an elevation defined by a maximum above which would be caused detrimental backups of sewage.

Figure 1:
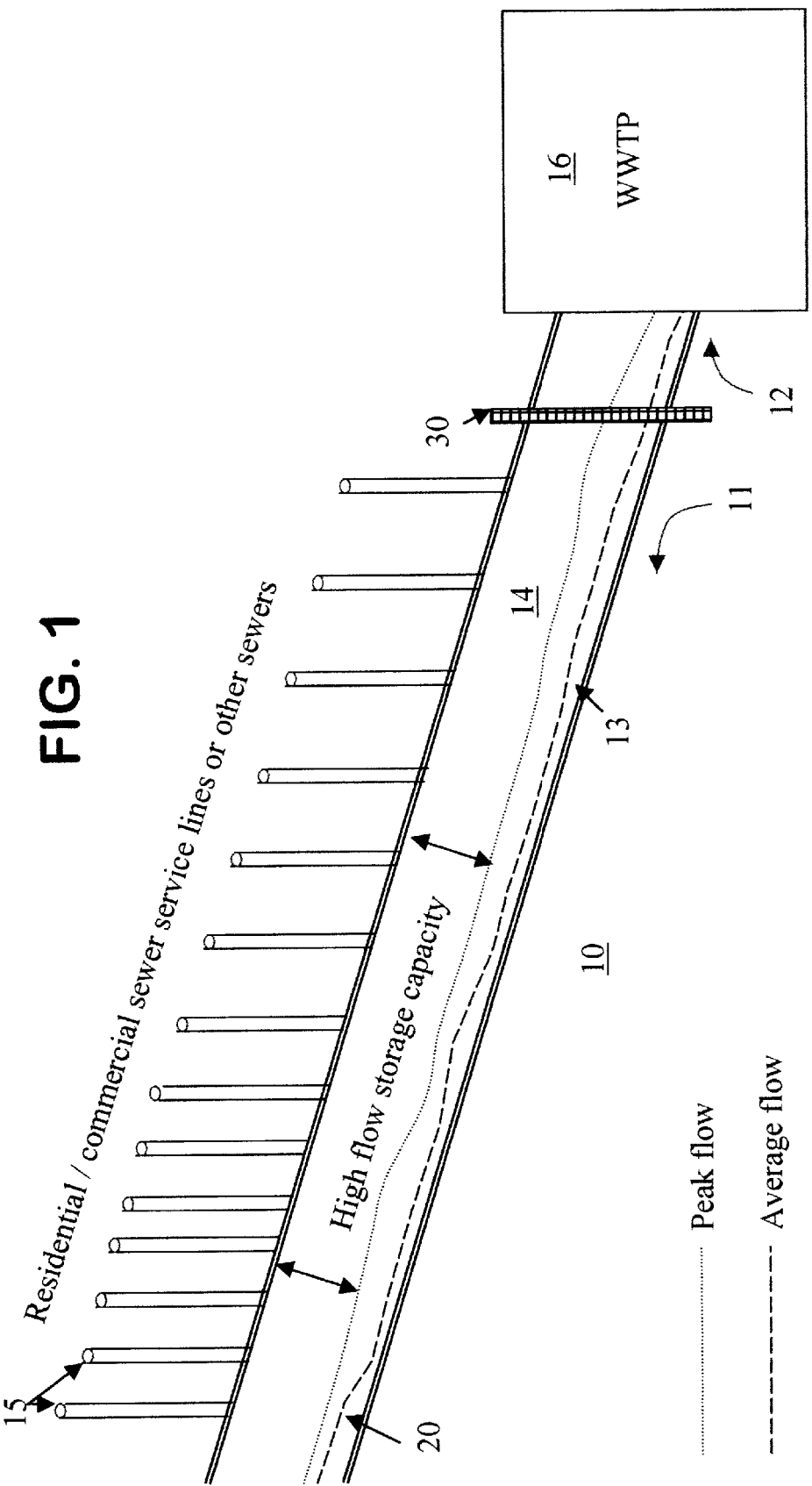
FIG. 1 is a side schematic elevation view of a typical flow in a sewer or interceptor segment.

With reference to FIG. 1 is shown a typical sewer segment (10) or conduit receiving wastewater from service lines (15) unregulated by a flow control device (30) and therefore not utilizing the air or gaseous portion (14) directly above the wastewater or liquid portion (13). The flow control device defines an upstream section (11) and a downstream section (12). For unregulated systems, the wastewater (20) passes unaffected through the flow control device to the downstream section (12) and ultimately to the wastewater treatment plant (16). By way of example as shown in Table 2, the wastewater flow varies in a diurnal flow pattern throughout the day with a high flow period centered around 3:00 PM and a low flow period centered around 4:00 AM.

Figure 2:
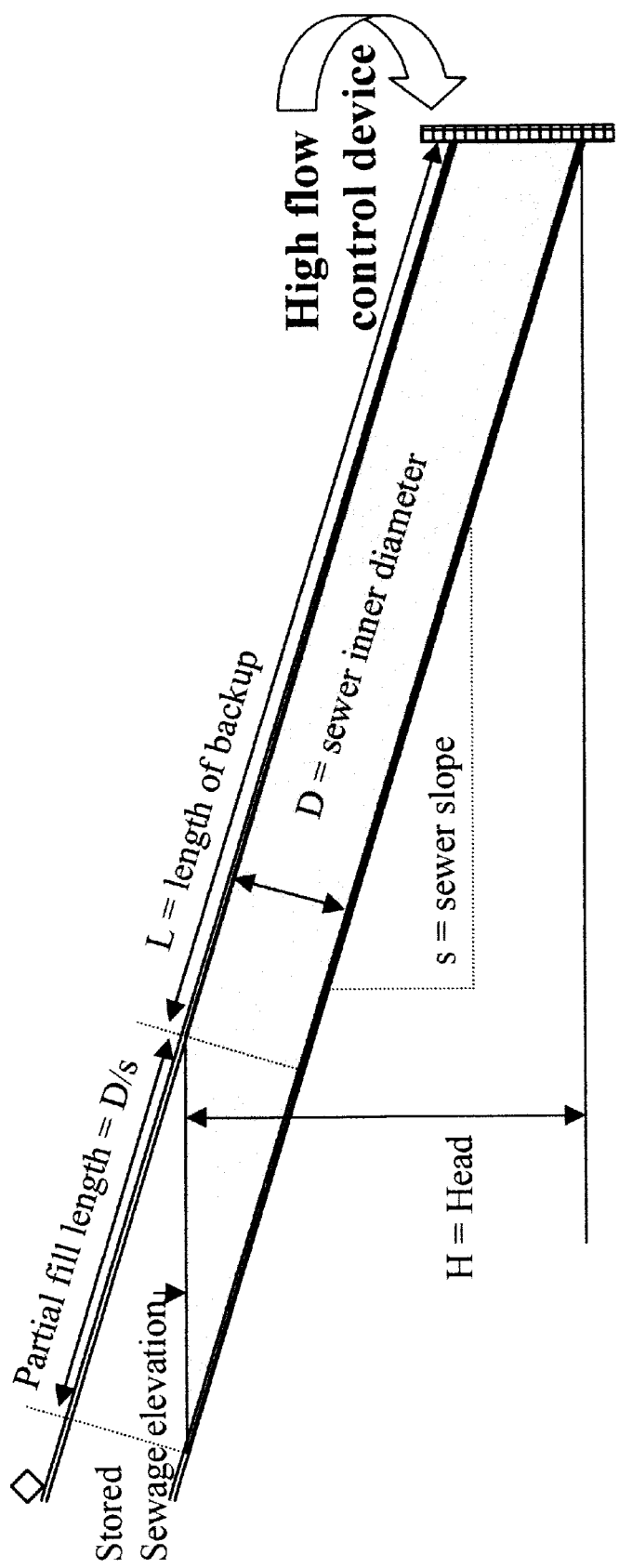
FIG. 2 is a side schematic elevation view of a control device temporarily storing high flows according to the present invention.

With reference to FIG. 1 and FIG. 2, as the wastewater (20) flow in the upstream section (11) increases, any flow in excess of a predetermined value will be limited by the flow control device (30) from reaching the downstream section (12). The wastewater (20) will then begin to backup into the upstream section of the sewer segment, displacing the gaseous portion with stored wastewater thereby increasing the liquid portion (13). During this time, the wastewater flow reaching the downstream section is limited to what can pass through the flow control device.

Figure 4A:
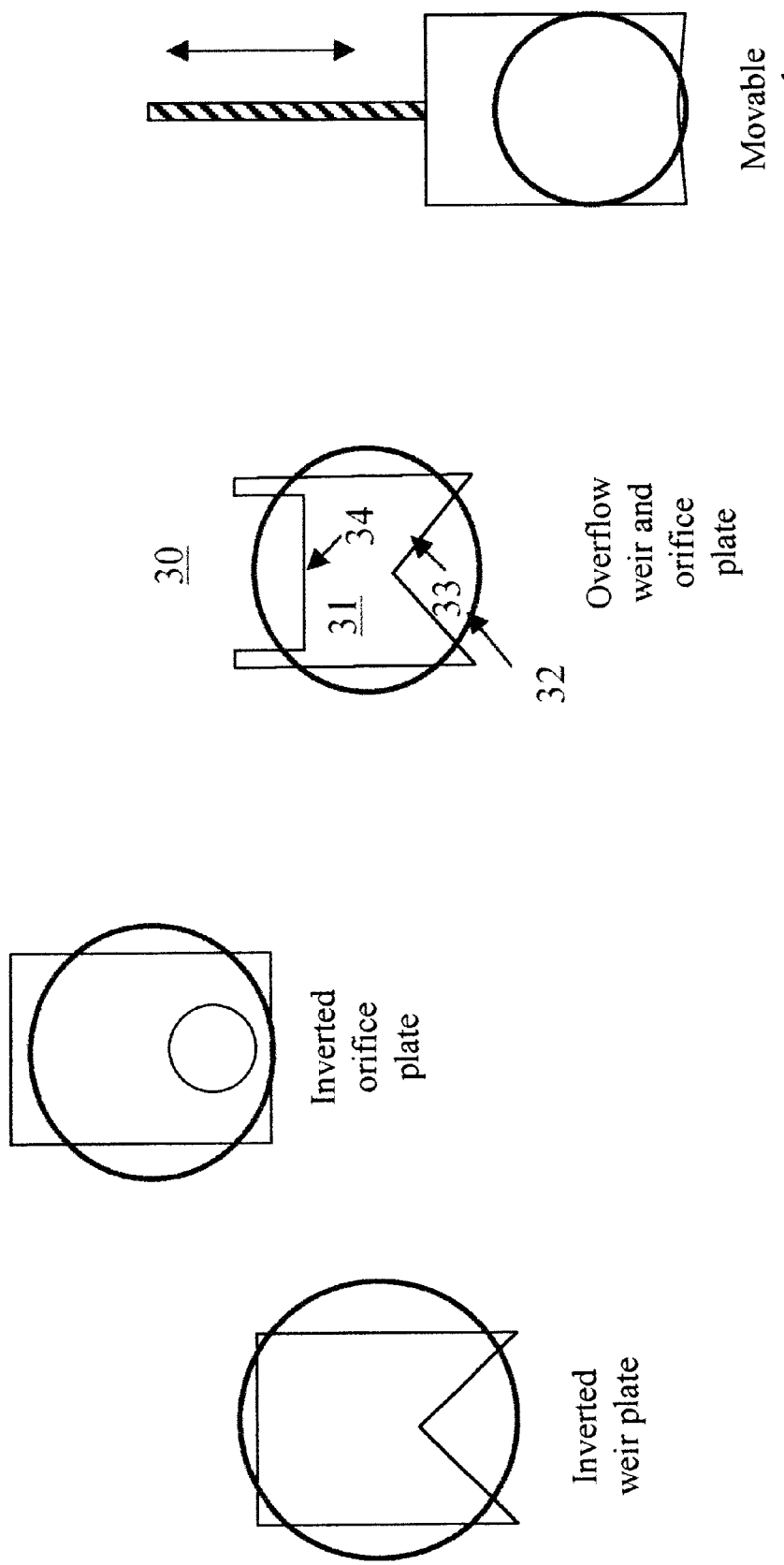
FIGS. 4a and 4b are cross sectional views of representative types of flow control devices for use in the present invention.
Figure 4B:
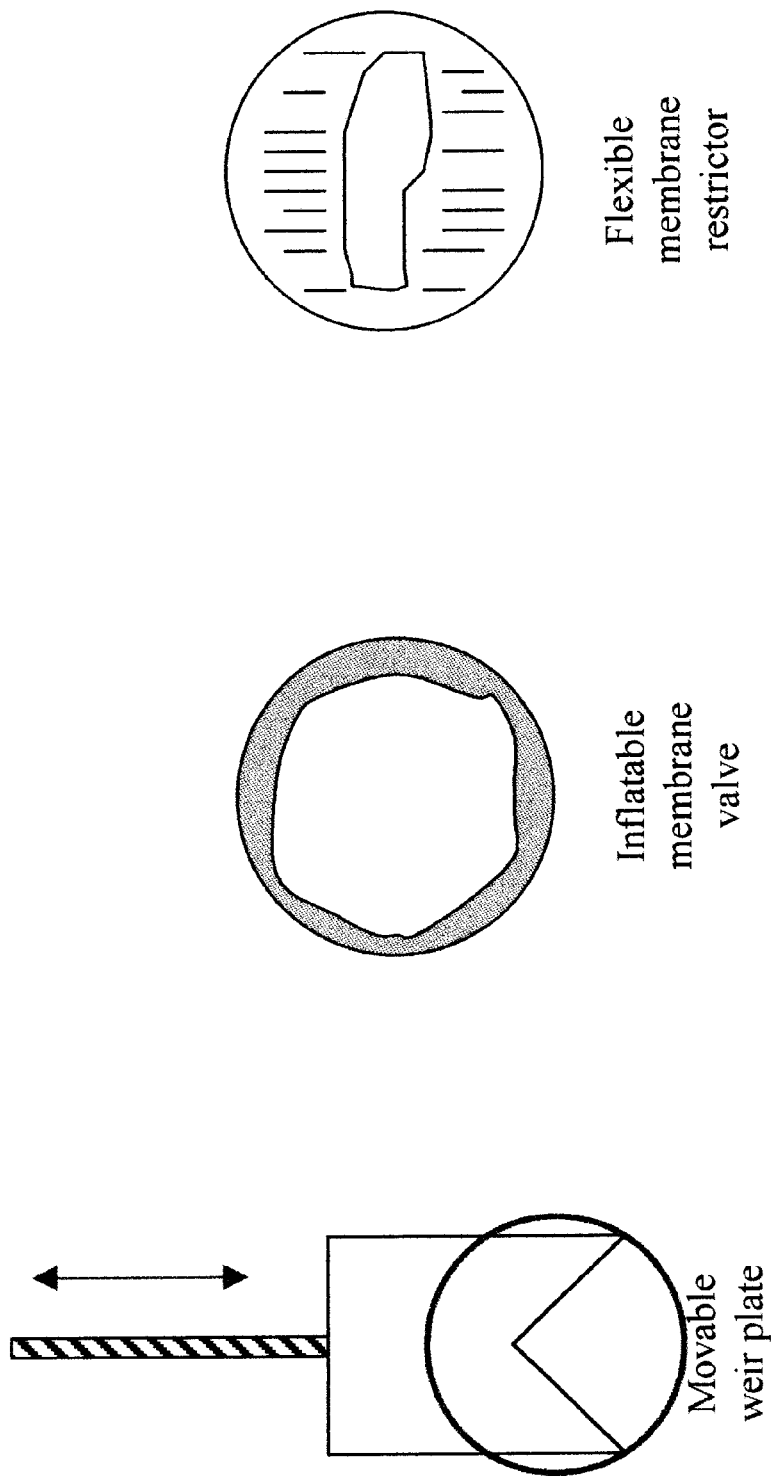
Figure 7:
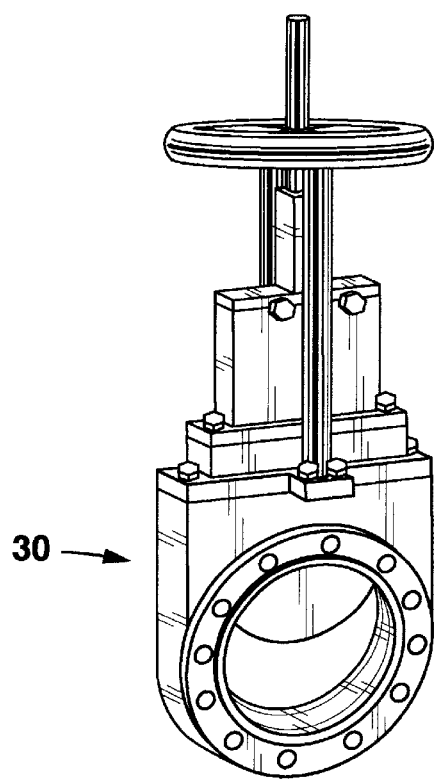
FIG. 7 is a sectional view of a prior art movable gate valve.
Figure 8:
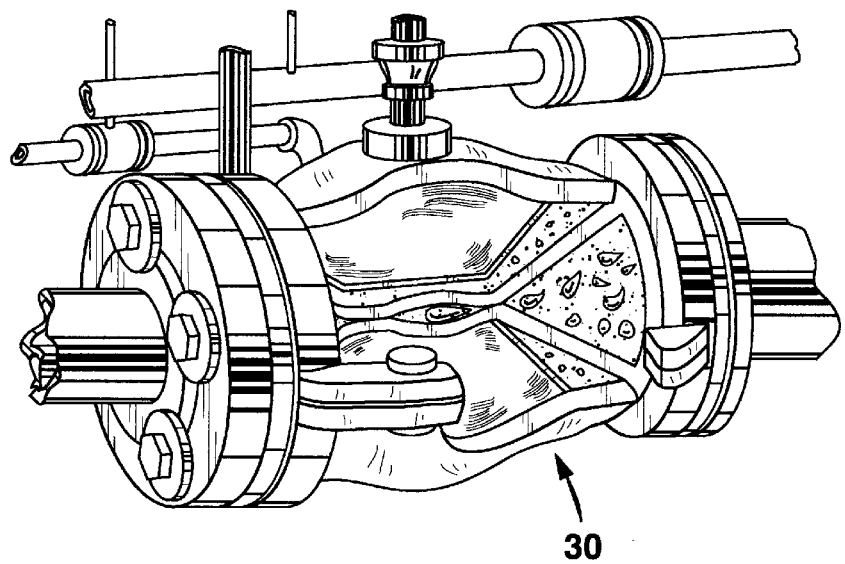
FIG. 8 is a section view of a prior art inflatable membrane valve.
Figure 9:
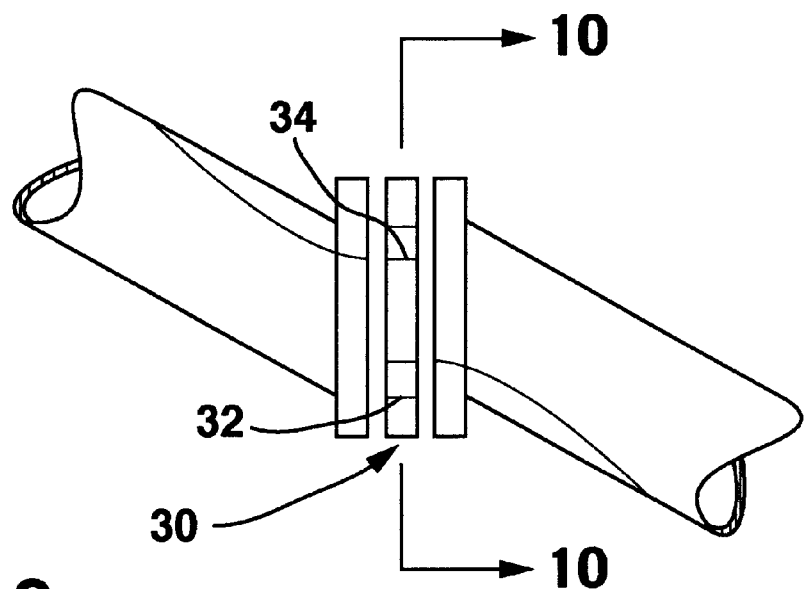
FIG. 9 is a sectional view of an overflow weir and orifice plate.
Figure 10:
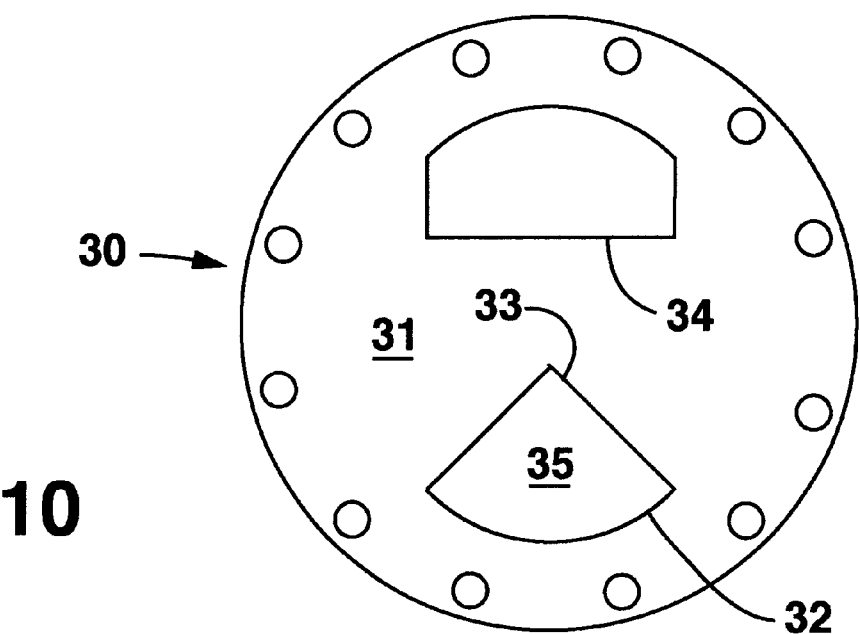
FIG. 10 is a section view of an overflow weir and orifice plate.

A number of flow control device's could be used with this invention. FIGS. 4a and 4b show the planar view of a number of possible flow control devices. FIGS. 7 and 8 show two of the prior art devices in greater detail. FIG. 7 shows a moveable gate valve with a mechanical valve operator. FIG. 8 shows an inflatable membrane valve with a pneumatic valve operator. Either valve can be regulated manually or can be provided with a control system for automated flow regulation. FIGS. 9 and 10 show a detailed view of an overflow weir and orifice flow control device for regulating wastewater flow. With reference to FIGS. 9 and 10, use of the overflow weir and orifice flow control device is described further below, although any number of flow control devices may be suitably used for flow control.

Furthermore, the flow control device will have an overflow or bypass capacity so that flows in excess of the anticipated peak capacity will overflow or bypass the control device without causing problems to the upstream sewer. Depending on the specific site, it may be preferable to utilize a fixed weir plate or a fixed adjustable opening weir plate to regulate flows, or an automated system that would provide flow control based on a timer, local controller, or remote computer system. The flow control device's may be, for example, a concentric membrane check valve or a movable gate or weir, mounted inside and extending outside of the sewer pipe that expands and contracts via feedback or timed control, or both, to respectively store and release the normal gravity flow of the sewage, or, the use of an existing parallel or alternate sewer pipe for purposeful storage and timed release which lessens on-peak treatment plant flows.

Figure 3:
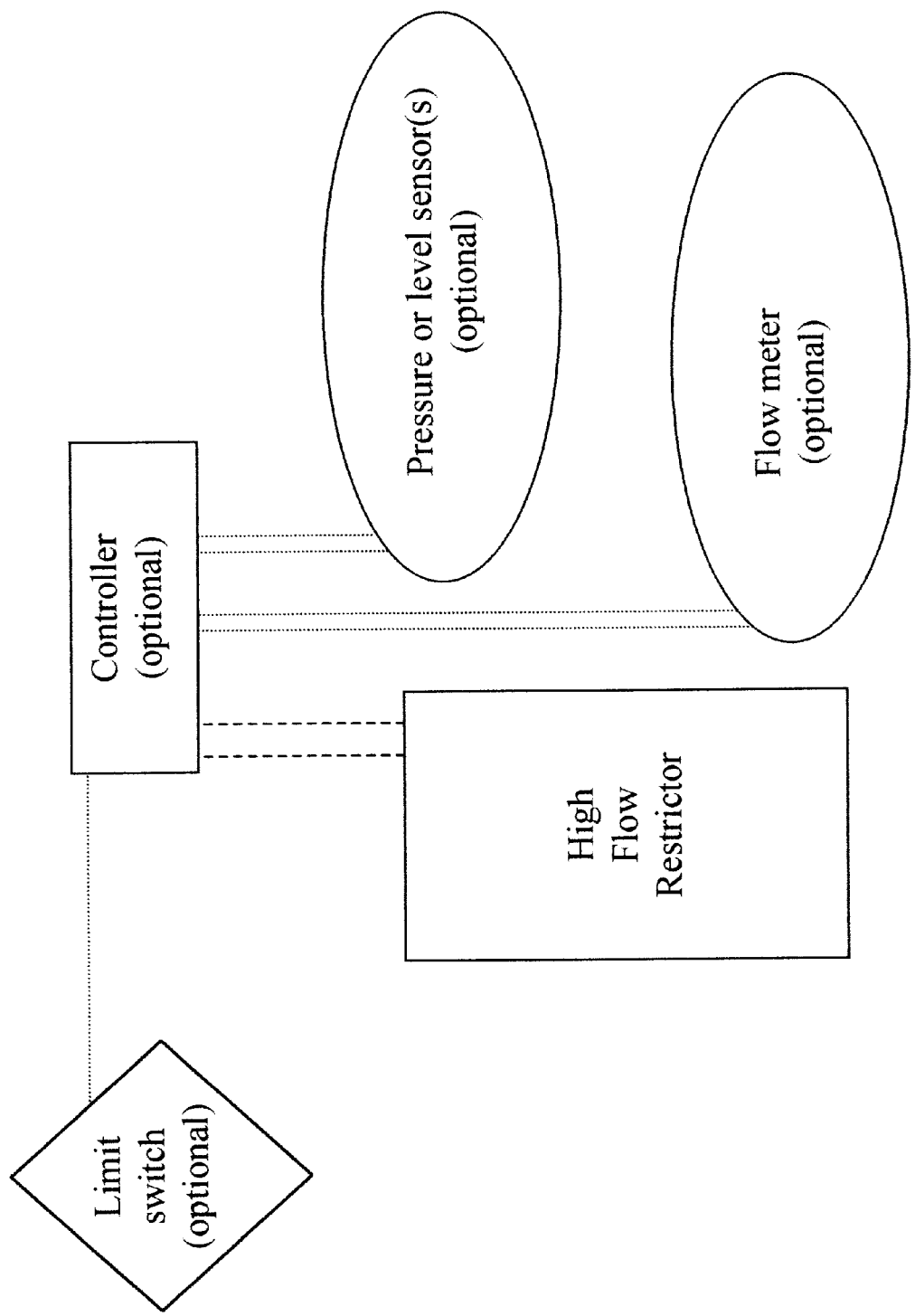
FIG. 3 is a schematic diagram of the components of the flow control device.

With respect to FIG. 3, if configured for automated operation, the control portion of the apparatus functions with either a level indicator or a bubble tube or other pressure sensing device which provides feedback to a controller on the upstream elevation and which is installed to minimize clogging by sewage debris. The controller is programmed to ramp up to the maximum allowable head based on the pressure reading of the bubble tube, and ramp down to full open during off-peak times; the exact ramping strategy is a result of algorithms developed in the methodology. A second control sensor may be located at the highest elevation point of the stored sewage to provide for redundant control system bypass. Optionally, a flow meter may be used to provide flow rate input to the controller to verify proper operation of the control device, or to provide for feedback control, or both.

Figure 5:
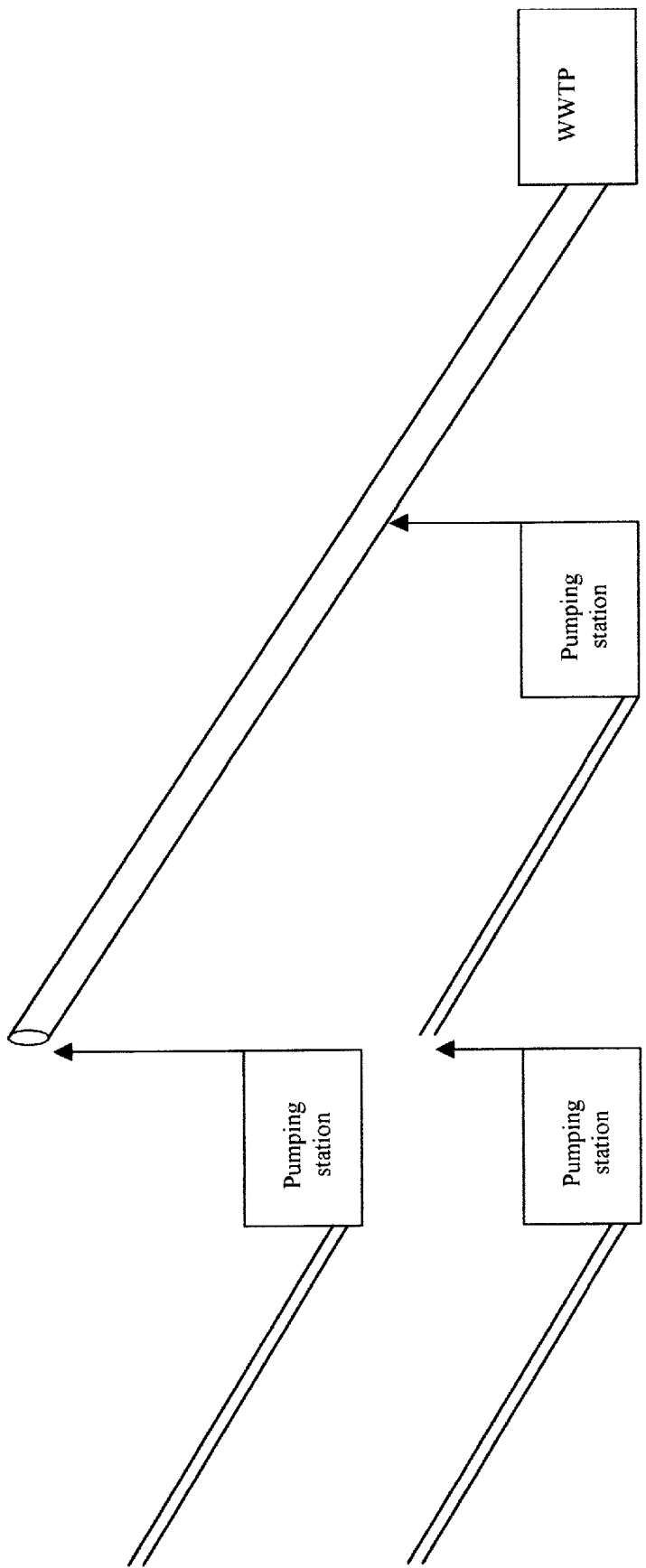
FIG. 5 is a schematic representation of a sewer network of segments connected in series and parallel.

The methodology by which the invention must be applied is unique because each sewerage network, its flows and the wastewater treatment facility's electrical rate structure are different. As shown in Table 2, an electrical rate structure may have an on-peak rate or high power cost period from 9:00 AM to 11:00 PM with the electrical rate structure's off-peak rate, or low power cost period from 11:00 PM to 9:00 AM. A schematic representation of a simple sewerage network is shown in FIG. 5. Critical comparisons at each sewerage network include: the storage capacity within each sewerage segment, and the resulting cumulative storage capacity within the network, the average on-peak and off-peak wastewater flows, the relative on-peak to off-peak electrical energy usage, the on-peak to off-peak energy charge, and the overall on-peak energy cost relative to the demand cost, and the flow at demand conditions relative to the average on-peak flow, and the relationship between WWTP flows and energy usage. It is readily apparent that generally, available storage in interceptor capacity near the WWTP would be utilized first. This would be preferable, since the largest interceptors which would provide the most storage for a given length, are usually installed immediately upstream of the WWTP. In addition, it would be easier to coordinate the release of stored wastewater with the off-peak energy period for the WWTP when the stored wastewater is near the WWTP. For wastewater stored away from the WWTP, the wastewater travel time may also have to be considered to ensure that stored wastewater is reaching the WWTP during the off-peak energy period.

Figure 6:
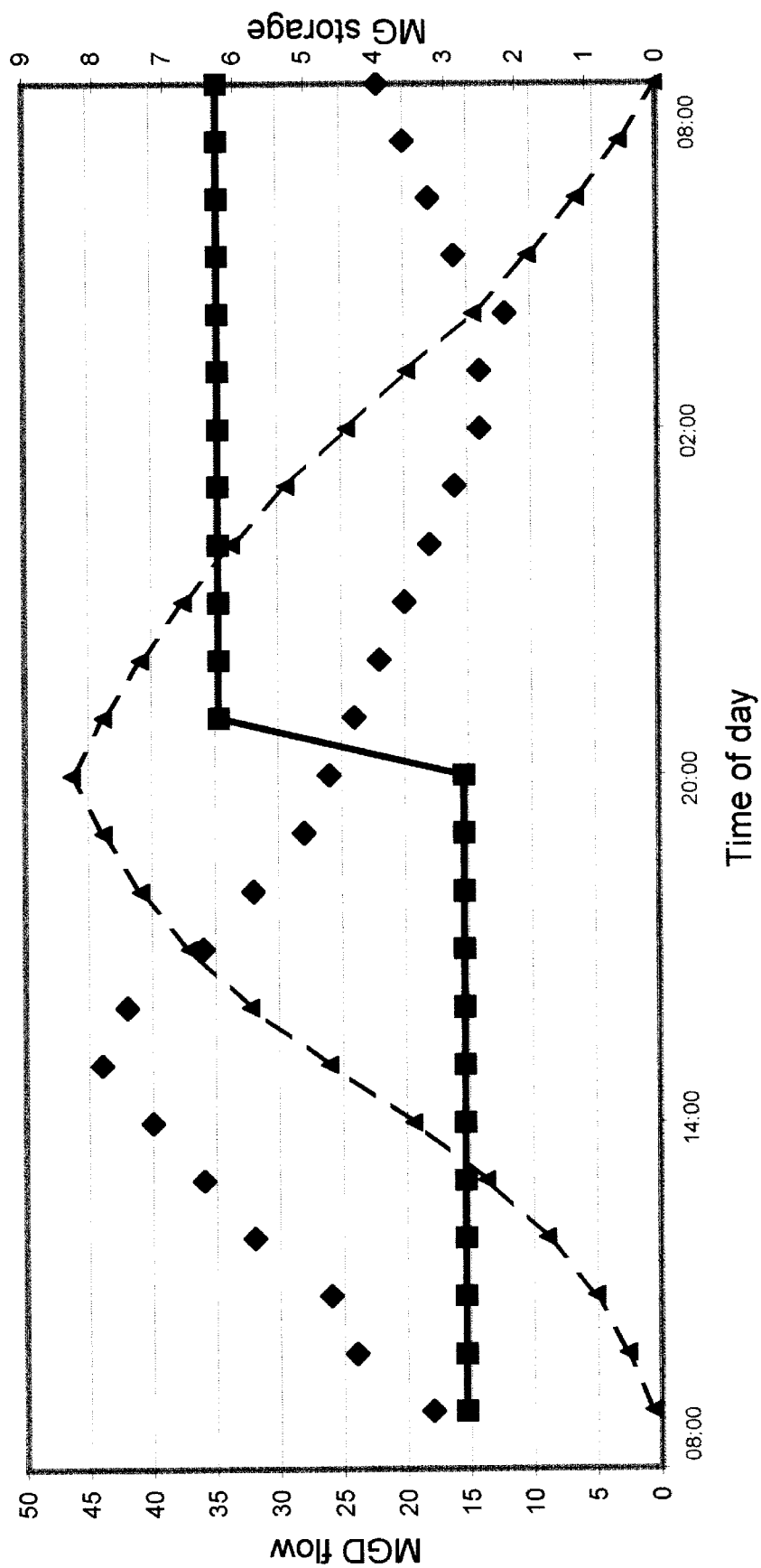
FIG. 6 is a cross sectional representation of sewer segments connected in series and parallel.

As described previously, each application of this invention would result in a system that would be unique to any specific wastewater treatment plant. However, the method of application of the invention includes the following steps:

1. Analyze the existing sewerage network, specifically to determine the relative positions of sewer pipes to each other, the size and lengths of the sewer pipes, their inlet and outlet elevations and the maximum sewage elevation of a given sewer piping segment upstream of a pumping station or treatment plant. Calculate total system storage based on multiple segments. A schematic of a sewer segment feeding a larger sewer network is shown in FIG. 1. The cumulative storage requirements over a typical 24-hr period is shown in Table 2. FIG. 6 shows an example of WWTP inlet flows with and without storage and the associated storage requirement.

2. Analyze the diurnal flows into the treatment plant, specifically to determine the ratio of the on-peak average WWTP flow and the off-peak average WWTP flow and the magnitude and timing of the on-peak average flow at demand conditions.

3. Analyze the diurnal energy use at the treatment plant, specifically to determine the magnitude and timing of the relative on-peak to off-peak energy demand and the ratio of the on-peak to off-peak energy usage as shown in Table 3.

4. Determine the relationship between WWTP flow reduction and the energy reduction. A constant relationship of 0.6 is shown in Table 3 for this simplified example.

5. Analyze the electrical rate structure, specifically to determine the ratio of the demand charge to the to the on-peak demand charge, and, the ratio of the on-peak energy charge to the off-peak energy charge. Table 3 provides a simplified example of this analysis.

6. Use a dynamic modeling systems approach to implement a systematic, temporary storage of sewage to control inlet flows into a wastewater treatment facility to minimize facility electrical cost, to maximize the capacity of plant clarifiers, aeration basins, channels and pumps, or a combination thereof.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

TABLE 1

Segment analysis to determine storage capacity

| Pump | Segment | Length (ft) | Diameter (in) | Pipe elevation high | Pipe elevation low | slope | Storage length (ft) partial[1] | Storage length (ft) full | Storage[2] (gallons) |
|---|---|---|---|---|---|---|---|---|---|
| 1 | 5 | 200 | 8 | 721.5 | 719.5 | 0.010 | 67 | 133 | 392 |
| 1 | 4 | 100 | 12 | 719.5 | 718.5 | 0.010 | 0 | 100 | 529 |
| 1 | 3 | 100 | 12 | 718.5 | 717.5 | 0.010 | 0 | 100 | 529 |
| 1 | 2 | 150 | 16 | 717.5 | 716 | 0.010 | 0 | 150 | 1410 |
| 1 | 1 | 200 | 16 | 716 | 714 | 0.010 | 0 | 200 | 1880 |
| On-peak average flow (gpd) | | | | | | | | 10000 assumed | |
| Off-peak average flow (gpd) | | | | | | | | 5000 assumed | |
| Estimated total storage capacity at pump station 1(gallons) | | | | | | | | 4739 | |
| On-peak average flow, adjusted for flow storage (gpd) | | | | | | | | 522 | |
| On-peak average flow reduction | | | | | | | | 95% | |
| Off-peak average flow, adjusted for storage release (gpd) | | | | | | | | 14478 | |

[1]Length of partial storage = (D/12)/slope, in feet
[2]90% available (low flow requirement)

TABLE 2

Effects of flow storage on WWTP flows

| Time | Demand status | WWTP inlet MGD | WWTP MG/hr | Cumulative MG inlet | Target MGD[1] | Req'd MG storage | Cumulative MG storage |
|---|---|---|---|---|---|---|---|
| 8 | | | | | | | |
| 9 | ON-peak | 18 | 0.75 | 0.75 | 18 | 0.00 | 0.0 |
| 10 | ON-peak | 24 | 1.00 | 1.75 | 18 | 0.25 | 0.3 |
| 11 | ON-peak | 26 | 1.08 | 2.83 | 18 | 0.33 | 0.6 |
| 12 | ON-peak | 32 | 1.33 | 4.17 | 18 | 0.58 | 1.2 |
| 13 | ON-peak | 36 | 1.50 | 5.67 | 18 | 0.75 | 1.9 |
| 14 | ON-peak | 40 | 1.67 | 7.33 | 18 | 0.92 | 2.8 |
| 15 | ON-peak | 44 | 1.83 | 9.17 | 18 | 1.08 | 3.9 |
| 16 | ON-peak | 42 | 1.75 | 10.92 | 18 | 1.00 | 4.9 |
| 17 | ON-peak | 36 | 1.50 | 12.42 | 18 | 0.75 | 5.7 |
| 18 | ON-peak | 32 | 1.33 | 13.75 | 18 | 0.58 | 6.3 |
| 19 | ON-peak | 28 | 1.17 | 14.92 | 18 | 0.42 | 6.7 |
| 20 | ON-peak | 26 | 1.08 | 16.00 | 18 | 0.33 | 7.0 |
| 21 | off-peak | 24 | 1.00 | 1.00 | 32 | −0.33 | 6.7 |
| 22 | off-peak | 22 | 0.92 | 1.92 | 32 | −0.42 | 6.3 |
| 23 | off-peak | 20 | 0.83 | 2.75 | 32 | −0.50 | 5.8 |
| 24 | off-peak | 18 | 0.75 | 3.50 | 32 | −0.58 | 5.2 |
| 1 | off-peak | 16 | 0.67 | 4.17 | 32 | −0.67 | 4.5 |
| 2 | off-peak | 14 | 0.58 | 4.75 | 32 | −0.75 | 3.8 |
| 3 | off-peak | 14 | 0.58 | 5.33 | 32 | −0.75 | 3.0 |
| 4 | off-peak | 12 | 0.50 | 5.83 | 32 | −0.83 | 2.2 |
| 5 | off-peak | 16 | 0.67 | 6.50 | 32 | −0.67 | 1.5 |
| 6 | off-peak | 18 | 0.75 | 7.25 | 32 | −0.58 | 0.9 |

TABLE 2-continued

Effects of flow storage on WWTP flows

| Time | Demand status | WWTP inlet MGD | WWTP MG/hr | Cumulative MG inlet | Target MGD[1] | Req'd MG storage | Cumulative MG storage |
|---|---|---|---|---|---|---|---|
| 7 | off-peak | 20 | 0.83 | 8.08 | 32 | −0.50 | 0.4 |
| 8 | off-peak | 22 | 0.92 | 9.00 | 32 | −0.42 | 0.0 |

[1]based on combined segment analysis

TABLE 3

Effect of flow storage on energy bill

| Parameters | No flow storage | With flow storage |
|---|---|---|
| Average WWTP flow (MGD) | 25 measured | 25 |
| Total system storage (MG) based on multiple segments | | 7 segment analysis |
| On-peak average WWTP flow (MGD) | 32 measured | 18 |
| Potential on-peak average flow reduction | | 44% (32 − 18)/32 |
| Off-peak average WWTP flow (MGD) | 18 measured | 32 |
| Potential off-peak average flow increase | | 78% (38 − 18)/18 |
| Relative on peak:off-peak energy usage | 1.78 determined | |
| Relative on-peak:off-peak energy charge | 1.32 determined | |
| Energy reduction:flow reduction ratio | 0.60 determined | |
| Ratio of demand:on-peak energy costs | 0.40 determined | |
| Flow at demand conditions:on-peak average flow | 2.00 determined | |
| Relative on-peak energy usage | 1.78 determined | 1.31 1.78—1.78*(44%)(0.60) |
| Relative on-peak energy charge | 1.32 determined | 1.32 |
| Relative on-peak energy bill | 2.34 | 1.73 1.31*1.32 |
| Relative off-peak energy usage | 1.00 | 1.47 1.00 + 1.00*(78%)(0.60) |
| Relative off-peak energy charge | 1.00 | 1.00 |
| Relative off-peak energy bill | 1.00 | 1.47 1.47*1.00 |
| Relative energy bill | 3.34 | 3.20 1.47 + 1.00 |
| % energy bill reduction | | 4% |
| Relative demand bill | 0.94 0.4*2.34 | 0.53 .94—.94*((2.00 − 1) + 44%)/2.00)*0.60 |
| % demand bill reduction | | 43% (0.94 − 0.53)/0.94 |
| Relative energy bill | 4.28 | 3.73 3.20 + 0.53 |
| % energy bill reduction | | 13% |

We claim:

1. An apparatus for flow control in combination with a sewer system to reduce wastewater treatment electrical costs comprising:

a sewer segment having an upstream section and a downstream section, the sewer segment also containing a liquid portion and a gaseous portion, a wastewater being conveyed within the sewer system passing through the sewer segment from the upstream section to the downstream section, a wastewater treatment plant being subject to an electrical rate structure, the wastewater treatment plant receiving a wastewater flow through the sewer system, the electrical rate structure having at least a high power cost period and a low power cost period, a control means located between the upstream section and the downstream section of the sewer segment, the control means periodically reducing the wastewater flow reaching the wastewater treatment plant during the high power cost period, the wastewater being temporarily stored in the gaseous portion of the upstream section, the control means periodically increasing the wastewater flow reaching the wastewater treatment plant during the low power cost period.

2. The apparatus of claim 1 in which the control means is a valve.

3. The apparatus of claim 1 in which the control means further comprises a pressure measurement means located in the upstream section.

4. The apparatus of claim 3 in which the control means further comprises a flow meter.

5. The apparatus of claim 1 wherein the control means is a weir plate.

6. The apparatus of claim 1 wherein the control means is an orifice plate.

7. The apparatus of claim 1 in which the control means is a pump.

8. A method to regulate a wastewater flow within a sewer system to reduce wastewater treatment electrical costs comprising the steps of:

providing at least one flow control device within a sewer segment of the sewer system, utilizing a wastewater treatment plant for receiving a wastewater, the wastewater treatment plant subject to an electrical rate structure, the electrical rate structure having at least a high power cost period and a low power cost period, using the flow control device to reduce a wastewater flow reaching the wastewater treatment plant during the high power cost period, temporarily storing a portion of the wastewater within the sewer system, and periodically releasing the wastewater to increase the wastewater flow reaching the wastewater treatment plant during the low power cost period.

9. An apparatus for controlling a liquid flow comprising:
- a conduit having an upstream section, a downstream section, and a lower surface,
- a body, having a substantially planar shape, being removably attached in the conduit between the downstream section and the upstream section, the body further having at least a first and second edge,
- the body first edge, located nearest the conduit lower surface defining an orifice with the conduit,
- the orifice restricting the liquid flow between the upstream section and the downstream section,
- the body second edge, located opposite the conduit lower surface, defining a weir surface for liquid flow between the upstream section and the downstream section.

10. The apparatus of claim 1 wherein said control means is the apparatus of claim 9.

11. An apparatus for flow control in combination with a sewer system to provide flow equalization for a wastewater treatment plant comprising:
- a sewer segment having an upstream section and a downstream section, the sewer segment also containing a liquid portion and a gaseous portion,
- a wastewater being conveyed within the sewer system to the wastewater treatment plant, the wastewater passing through the sewer segment from the upstream section to the downstream section, the wastewater treatment plant receiving a wastewater flow through the sewer system, the wastewater flow having a diurnal flow pattern, the diurnal flow pattern generally having a high flow period and a low flow period,
- a control means located between the upstream section and the downstream section of the sewer segment, the control means periodically reducing the wastewater flow reaching the wastewater treatment plant during the high flow period the wastewater being temporarily stored in the gaseous portion of the upstream section, the control means periodically increasing the wastewater flow reaching the wastewater treatment plant during the low flow period.

12. The apparatus of claim 11 in which the control means is a valve.

13. The apparatus of claim 11 in which the control means further comprises a pressure measurement means located in the upstream section.

14. The apparatus of claim 13 in which the control means further comprises a flow meter.

15. The apparatus of claim 11 wherein the control means is a weir plate.

16. The apparatus of claim 11 wherein the control means is an orifice plate.

17. The apparatus of claim 11 in which the control means is a pump.

18. A method to regulate a wastewater flow within a sewer system to provide flow equalization for a wastewater treatment plant receiving a wastewater, the method comprising the steps of:
- providing at least one flow control device within a sewer segment of the sewer system, the wastewater flow having a diurnal flow pattern, the diurnal flow pattern having at least a high flow period and a low flow period,
- utilizing the flow control device to reduce the wastewater flow reaching the wastewater treatment plant during the high flow period, temporarily storing a portion of the wastewater within the sewer system, and
- periodically releasing the wastewater to increase the wastewater flow reaching the wastewater treatment plant during the low flow period.

* * * * *